United States Patent
Kuan

[11] Patent Number: 5,437,843
[45] Date of Patent: Aug. 1, 1995

[54] OZONIZER

[76] Inventor: Yu-hung Kuan, 3rd Fl., 247, Ta Hsing Road, Taoyuan, Taiwan

[21] Appl. No.: 87,527
[22] Filed: Jul. 8, 1993
[51] Int. Cl.[6] .......................................... C01B 13/11
[52] U.S. Cl. ........................ 422/186.07; 422/186.07; 422/907
[58] Field of Search ................ 422/186.07, 186.18, 422/907

[56] References Cited

U.S. PATENT DOCUMENTS

| | | | |
|---|---|---|---|
| 2,658,868 | 11/1953 | Collison | 204/320 |
| 3,967,131 | 6/1976 | Slipiec et al. | 250/539 |
| 4,504,446 | 3/1985 | Kunicki et al. | 422/186.19 |
| 4,774,062 | 9/1988 | Heinemann | 422/186.19 |
| 4,859,429 | 8/1989 | Nispnson | 422/186.13 |
| 4,877,588 | 10/1989 | Ditzler et al. | 422/186.19 |
| 5,147,614 | 9/1992 | Conrad | 422/186.18 |
| 5,169,606 | 12/1992 | Batchelor | 422/186.19 |
| 5,332,556 | 7/1994 | Coakley et al. | 422/186.18 |
| 5,348,709 | 9/1994 | Wheatley | 422/186.18 |

Primary Examiner—Donald P. Walsh
Assistant Examiner—Daniel Jenkins
Attorney, Agent, or Firm—Bacon & Thomas

[57] ABSTRACT

An ozonizer for refreshing the room with clean air and lessening the green house effect, generally comprising of a base, a housing, a high voltage unit, an air compressor, and an ozone converter.

2 Claims, 5 Drawing Sheets

5,437,843

OZONIZER

BACKGROUND OF THE INVENTION

The present invention relates to an ozonizer, and more particularly to an ozonizer of new structure.

In recent years, excess consumption of chlorofluro-carbons (CFC) and heavy emission of nitrogen oxides by air planes have made the ozone layer thinner and thinner. If the ozone layer gets damaged, human beings would not be protected from being hurt by ultraviolet rays, and green house effect would be increased to destroy the ecological balance in the earth.

SUMMARY OF THE INVENTION

The present invention has been accomplished under the aforesaid circumstance. It is the main object of the present invention to provide an ozonizer from which the ozone produced can react on and decompose the contaminants in the air, thus purifying the air to refresh the room with clean air and prevent the ozone layer from being destroyed.

It is another object of the present invention to provide an ozonizer which can produce ozone to help keep out the ultraviolet rays and lessen the green house effect.

It is another object of the present invention to provide an ozonizer which use an electrode screen as the positive pole to give a powerful electric discharge for producing higher concentration of ozone.

It is still another object of the present invention to provide an ozonizer which can be produced in large quantity at low cost.

It is another object of the present invention to provide an ozonizer in which the ozone converter thereof can be connected with another converter or more in series until the required ozone concentration has been duly obtained.

DETAILED DESCRIPTION OF THE PREFERRED EMBODIMENT

Figure 1:
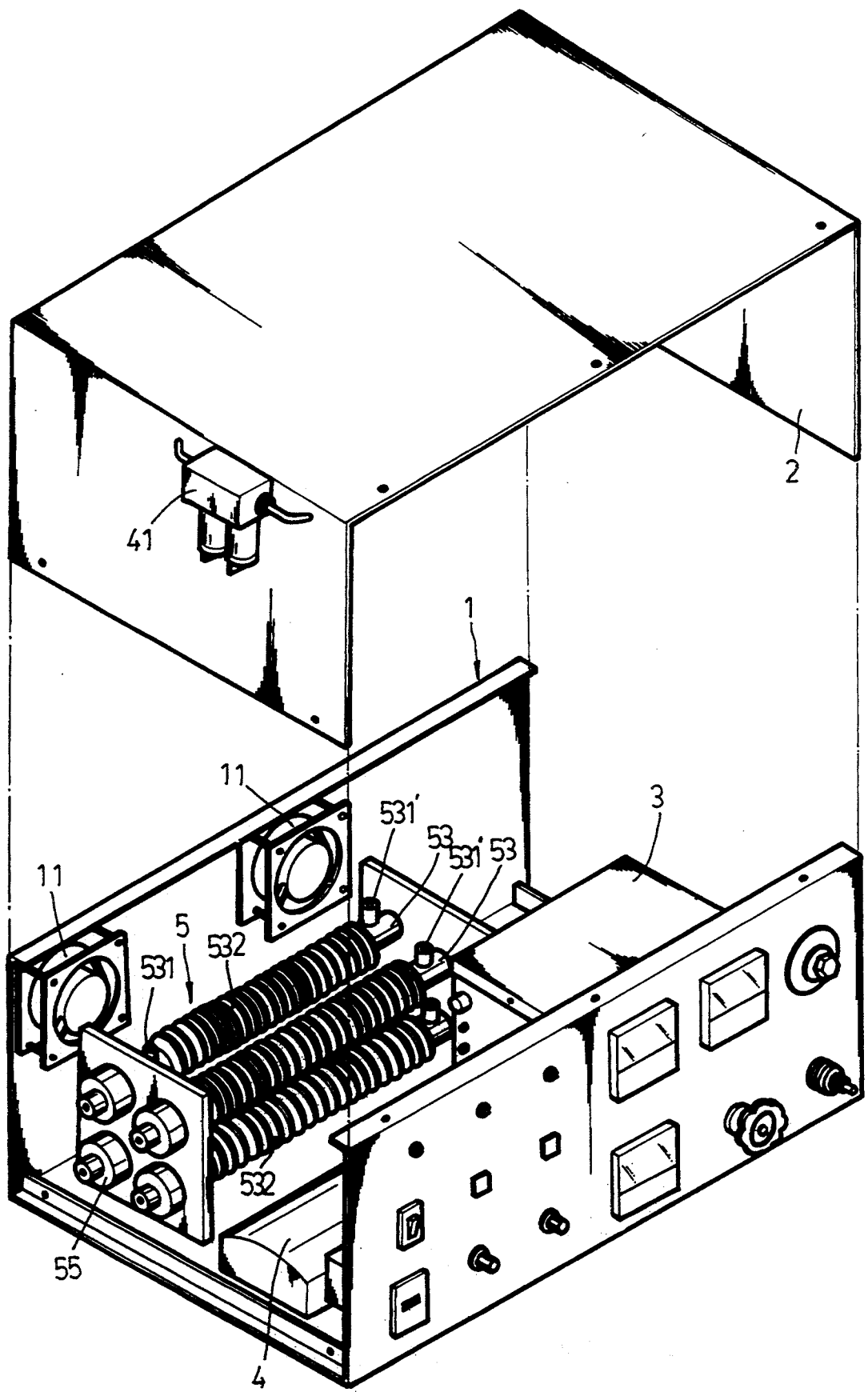
FIG. 1 is an exploded view of an embodiment according to the present invention.

Referring to FIG. 1, an ozonizer in accordance with the present invention is generally comprised of a base 1, a housing 2, a high voltage unit 3, an air compressor 4, and an ozone converter 5.

The base 1 is fitted to the housing 2 at the bottom for securing the high voltage unit 3 and air compressor 4 thereon. Both ends of ozone converter 5 are respectively connected to the high voltage unit 3 and air compressor 3 to produce ozone for refreshing the room with clean air.

Figure 2:
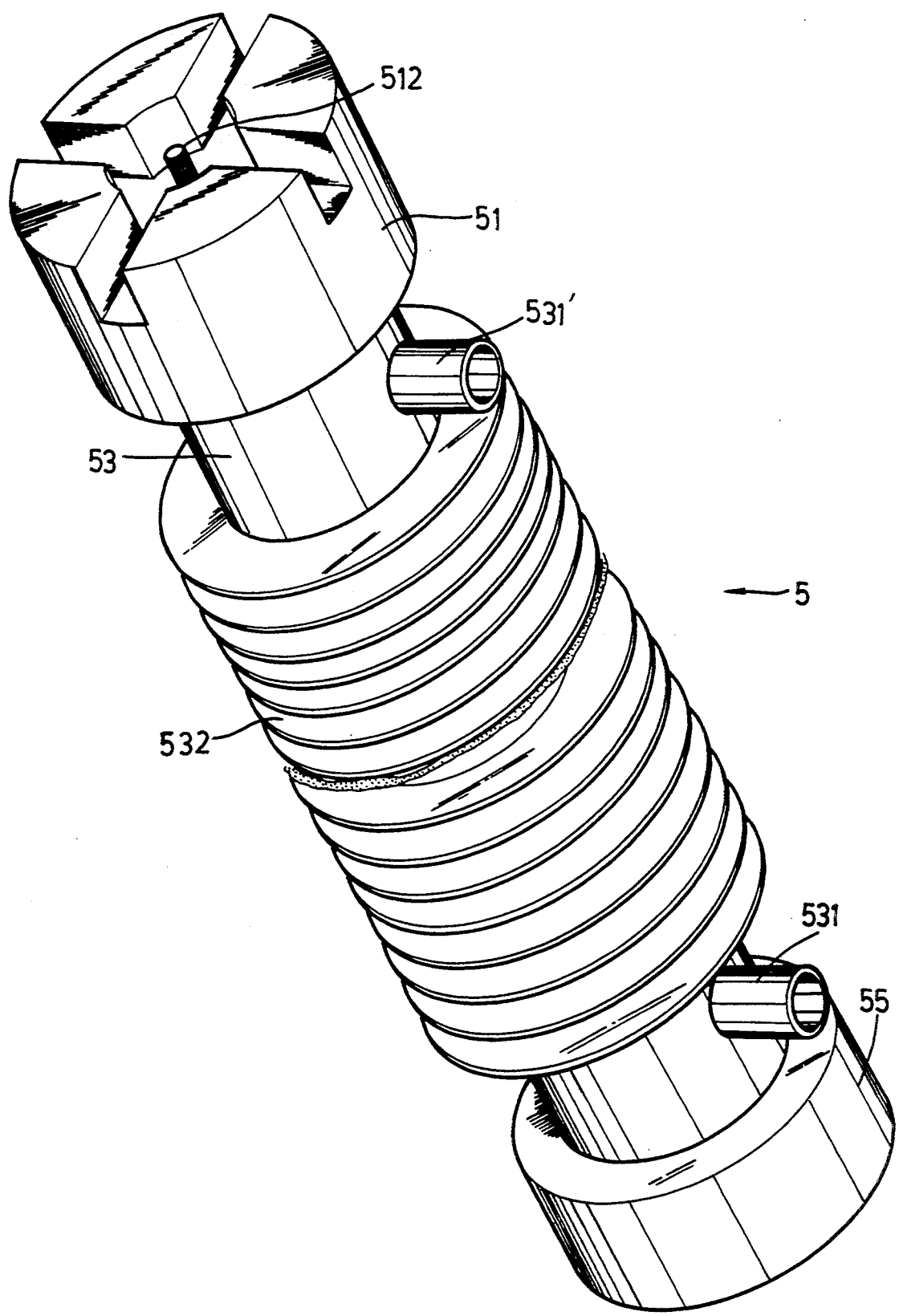
FIG. 2 is a perspective view of an ozone converter according to the present invention.
Figure 3:
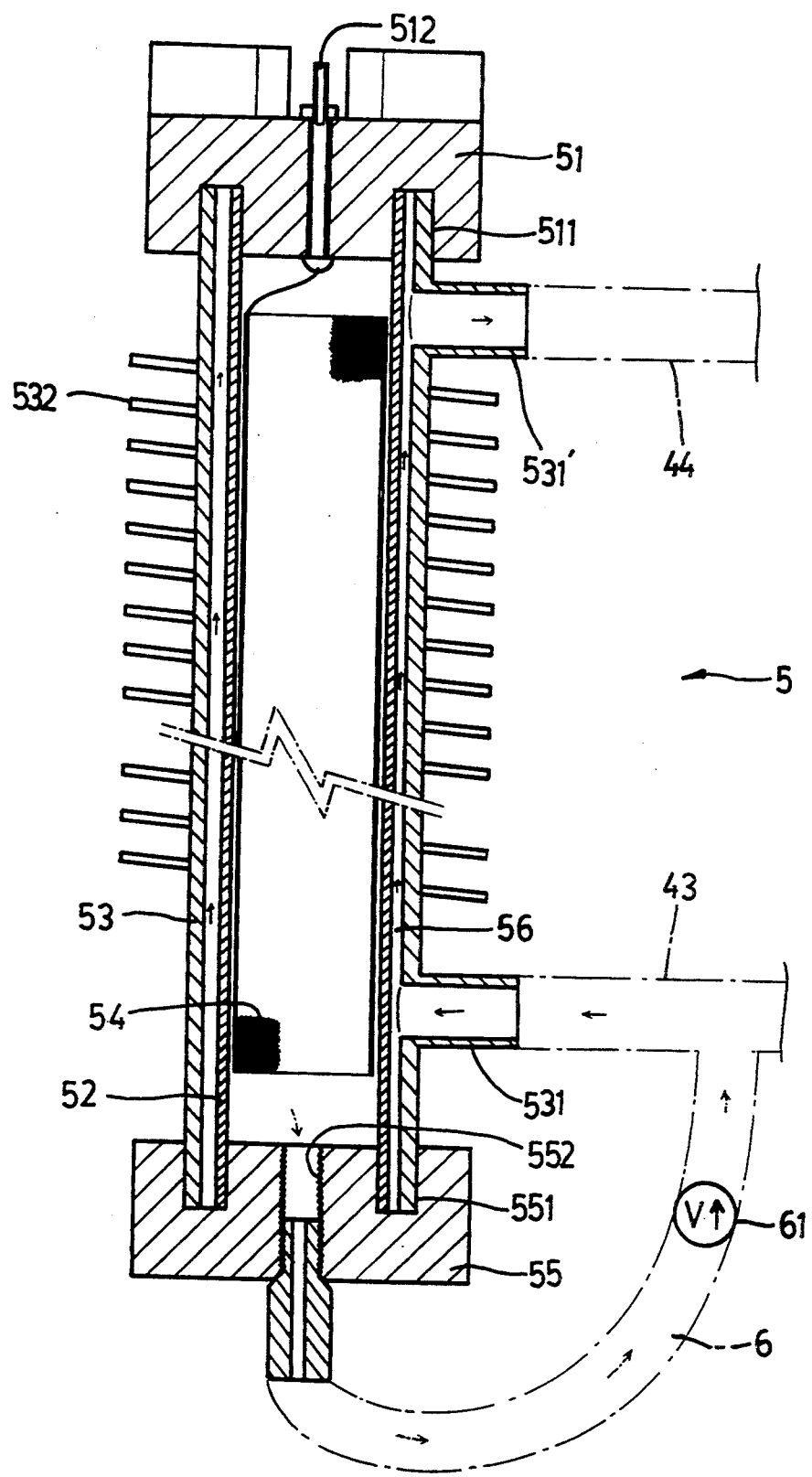
FIG. 3 is a sectional view of an ozone converter according to the present invention.
Figure 4:
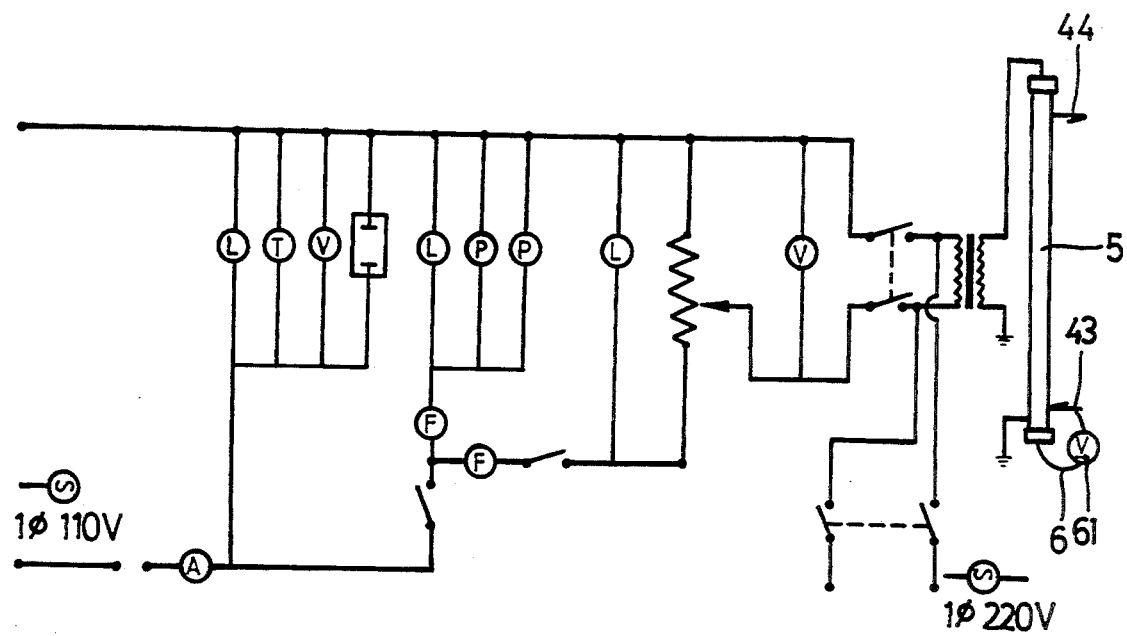
FIG. 4 is a circuit diagram according to the present invention.
Figure 5:
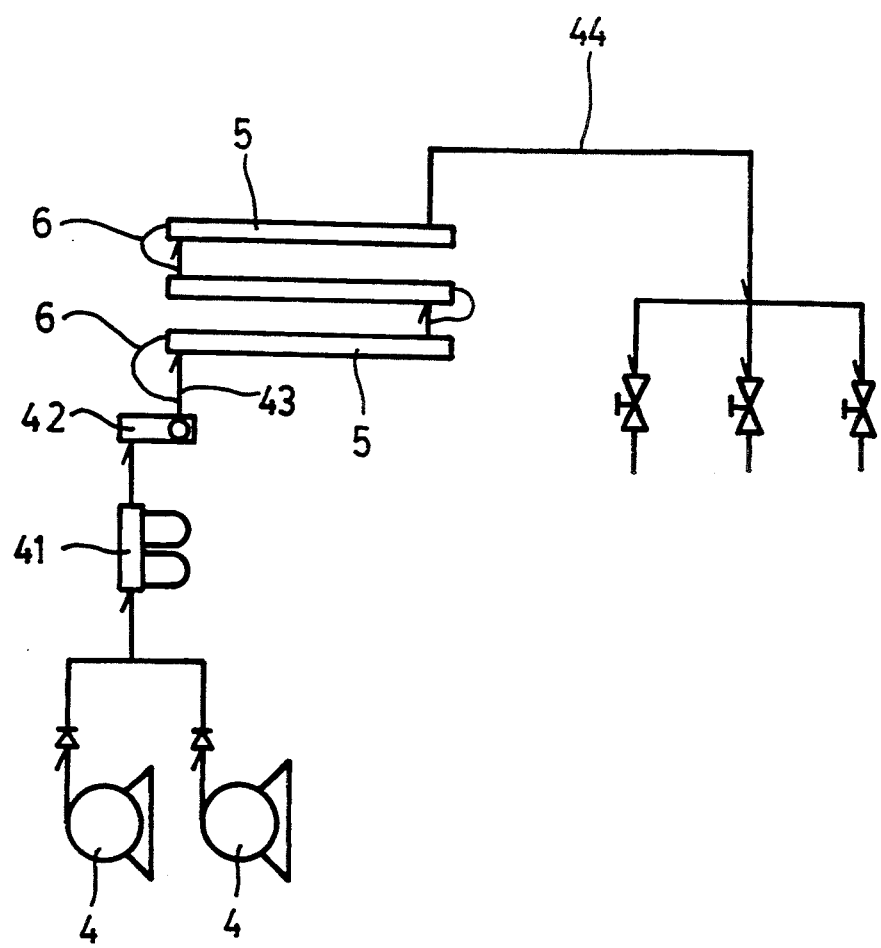
FIG. 5 is a piping diagram according to the present invention.

Referring to FIGS. 2 and 3, the ozone converter 5 is comprised of an electrode member 51, an inner pipe 52, an outer pipe 53, an electrode screen 54, and a coupler 55, wherein the electrode member 51 has an electrode pin 512 extended from the center thereof for electrically connecting to the high voltage unit 3 (see the circuit diagram as shown in FIG. 4), and a circular groove 511 at one side thereof to allow for insertion of the inner pipe 52 made of insulating materials such as porcelain, quartz, etc. and the conductive outer pipe 53 to be against the inner and outer walls of the circular groove 511, thus making the outer wall of the inner pipe 52 and the inner wall of the outer pipe 53 to form a circular air passage 56'. The outer pipe 53 also has an air inlet 531 and an air outlet 531' laterally extended therefrom, and spiral radiating fins wound round the surface thereof. The electrode screen 54 is retained in the inner pipe 52 with one end electrically connecting to the electrode pin 512 of the electrode member 51 for high voltage connection. The coupler 55 is provided with an exhaust hole 552 at the center for connecting an exhaust pipe 6 and a one-way valve 61 to an air pipe 43 which connects with the air compressor 4, and a stop groove 552 corresponding to the circular groove 511 of the electrode member 51 to allow for insertion of the inner pipe 52 and outer pipe 53 to be against its inner and outer walls, respectively.

While the electrode screen 52 of the ozone converter 5 according to the present invention has a high voltage connection by means of the high voltage unit 3, the air produced from the air compressor 4 will first pass through a filter 41 for dewatering and oil removing, then be controlled by a flowmeter 42 to flow into the air inlet 531 through the air pipe 43, making the circular air passage 56 between the inner pipe 52 and the outer pipe 53 to be full of air. After an electric discharge by the electrode screen 54, static electric arc reaches the outer pipe 53 through the inner pipe 52 to produce ozone in the circular air passage 56. Then the ozone is let out from the air outlet 531' at the opposite end of the outer pipe 53 to refresh the room and lessen the green house effect. Further, the heat thus produced can be rapidly sent out by the radiating fins 532, and there are fans 11 which can help enhance the radiating effect.

As the air or a little of ozone in the inner pipe 52 will be drawn from the exhaust hole 552 of the coupler 55 to the air pipe 43 through the exhaust pipe 6 and one-way valve 61, causing the inner pipe 52 to be almost vacuum, the inner pipe 52 is insulated from the rising temperature resulted from the electric connection of the electrode screen 54, thus enjoying a longer service life.

The ozone converter 5 according to the present invention is used for producing ozone. The air outlet 531' of one ozone converter 5 can be connected with the air inlet 531 of another ozone converter 5. Such connection can be repeated until the required ozone concentration has been duly obtained.

What is claimed is:

1. An ozonizer having a base and a housing enclosing a high voltage unit, an air compressor and an ozone converter, wherein the ozone converter comprises:

a) an electrode member having an electrode pin extending from a center thereof and having a circular groove formed in a side thereof with an inner wall and an outer wall;

b) a hollow inner pipe of electrically insulating material having a first inner end inserted into said circular groove of said electrode member against the inner wall thereof and a second inner end;

c) a hollow outer pipe of electrically conductive material having a first outer end inserted into said circular groove of said electrode member against the outer wall, thereby making the outer pipe and the inner pipe spaced apart to form a circular air passage therebetween, said outer pipe further comprising a second outer end, an air inlet and an air outlet laterally extending therefrom, and spiral radiating fins wound round a surface thereof;

d) an electrode screen located in said inner pipe having an end thereof electrically connected to said electrode pin of said electrode member;

e) a coupler having an exhaust hole at a center thereof and a stop groove with inner and outer walls, the coupler connected to the second inner end and the second outer end such that said inner end and said outer end are respectively inserted against the inner and outer walls thereof;

f) air pipe means connecting an outlet of the air compressor to the air inlet of the outer pipe;

g) a vacuum source connected to the exhaust hole of said coupler;

wherein a high voltage electric discharge by said electrode screen will cause a static electric arc to reach said outer pipe through said inner pipe when air flows in said circular air passage from said air inlet of said outer pipe, thus producing ozone in said air passage which is exhausted through said outlet, during which a vacuum is created within the inner pipe during supply of air to the circular air passage.

2. An ozonizer as in claim 1 comprising a plurality of ozone converters and having an air outlet of at least one ozone converter connected with an air inlet of at least one other ozone converter.

* * * * *